US007734508B2

(12) United States Patent
Hayes et al.

(10) Patent No.: US 7,734,508 B2
(45) Date of Patent: *Jun. 8, 2010

(54) METHOD FOR MANAGING AN ELECTRONIC-COMMERCE SHOPPING CART

(75) Inventors: Dennis Frank Hayes, Marietta, GA (US); Stephen Eric Jaffe, Alpharetta, GA (US); Dellena Wyman Priester, Austell, GA (US)

(73) Assignee: International Business Machines Corporation, Armonk, NY (US)

( * ) Notice: Subject to any disclaimer, the term of this patent is extended or adjusted under 35 U.S.C. 154(b) by 944 days.

This patent is subject to a terminal disclaimer.

(21) Appl. No.: 11/463,617

(22) Filed: Aug. 10, 2006

(65) Prior Publication Data

US 2006/0293970 A1    Dec. 28, 2006

Related U.S. Application Data

(62) Division of application No. 09/845,362, filed on Apr. 30, 2001, now Pat. No. 7,110,968.

(51) Int. Cl.
*G06Q 30/00* (2006.01)

(52) U.S. Cl. .................................. 705/26; 705/1; 705/27

(58) Field of Classification Search .................. 705/26, 705/27
See application file for complete search history.

(56) References Cited

U.S. PATENT DOCUMENTS

| 5,918,214 | A | 6/1999 | Perkowski |
| 5,950,173 | A | 9/1999 | Perkowski |
| 5,971,277 | A | 10/1999 | Cragun et al. |
| 6,064,979 | A | 5/2000 | Perkowski |
| 6,128,600 | A | 10/2000 | Imamura et al. |
| 6,711,619 | B1 | 3/2004 | Chandramohan et al. |
| 2003/0088483 | A1 * | 5/2003 | Moyer .......................... 705/27 |

* cited by examiner

*Primary Examiner*—Yogesh C Garg
(74) *Attorney, Agent, or Firm*—Schmeiser, Olsen & Watts; Anna L. Linne; David R. Irvin

(57) ABSTRACT

A method and system for managing an electronic commerce (e-commerce) shopping cart relating to communication between a shopper and a server over a communication network. A sever whether a shopping command of the shopper has changed an attribute of a primary item in the shopping cart. After the server has determined that the shopping command has changed the attribute of the primary item in the shopping cart, the server identifies a secondary item in the shopping cart linked to the primary item. The server changes a corresponding attribute of the secondary item in response to the change in the attribute of the primary item, wherein the attribute of the primary item is a quantity of the primary item, a color of the primary item, or a size of the primary item.

20 Claims, 3 Drawing Sheets

METHOD FOR MANAGING AN ELECTRONIC-COMMERCE SHOPPING CART

This application is a Divisional of Ser. No. 09/845,362, filed Apr. 30, 2001, now U.S. Pat. No. 7,110,968 issued Sep. 19, 2006.

FIELD OF THE INVENTION

The present invention applies to on-line Internet shopping, and more particularly to a method for managing and updating a shopping cart conveniently as an on-line customer adds, changes, and deletes items from the shopping cart.

BACKGROUND

On-line commerce is now an important part of our economy, mainly because of the efficiency and the ready convenience that on-line commerce provides. As a general principle, ready convenience and good human factors go hand-in-hand. Moreover, each improvement in human factors opens the use of electronic commerce to a larger segment of the population.

Today, however, many would-be participants in electronic commerce (e-commerce) are limited by the capabilities of the computer systems they use to gain access to e-commerce web servers. This limitation is often experienced, for example, by customers who shop on-line. Because the items to be purchased are not actually seen by the customer at the time the items are selected—rather, the items are carried virtually in an abstract shopping cart—the customer is not able to keep track of purchases conveniently.

One way that the lack of visibility may confound a shopper involves the purchase of linked items. Items are linked when the purchase of a primary item, for example a computer printer, is normally coupled with the purchase of a secondary item, for example a power cord for the printer. When the shopper changes the quantity of a primary item in the shopping cart, for example revising the quantity of the order from four printers to six printers, the shopper must remember also to revise the quantity of the secondary item, here from four power cords to six.

If the shopper forgets to change an attribute of the secondary items in the shopping cart in response to each change in a related attribute of the primary items, the shopper's order will not be filled as intended. As a result, the shopper will be disappointed by the on-line shopping experience, and perhaps be disappointed in the on-line merchant as well.

Thus there is a need for a way of helping an on-line shopper maintain the proper relationship in the shopping cart between primary items and secondary items that are normally ordered along with the primary items, so that the on-line merchant may fill the shopper's order as the shopper intends, and so that the shopper maintains confidence in the on-line shopping process.

SUMMARY OF THE INVENTION

The present invention helps an on-line shopper maintain the proper relationship between primary items in a shopping cart and secondary items in the shopping cart, where secondary items are items that normally accompany the purchase of primary items. According to the invention, the server that provides the on-line shopping service awaits a shopper's commands. When a command is received that changes an attribute of a primary item, the server checks the shopper's shopping cart to identify any secondary items that might be linked to the primary item being changed. If a secondary item linked to the primary item is identified, the server may then solicit the shopper's authorization to change the corresponding attribute of the secondary item. If the shopper grants authorization, either explicitly or implicitly, the server changes the corresponding attribute of the secondary item.

In one embodiment of the invention, the attribute of the primary item is the quantity of the primary item in the shopping cart. When the shopper changes the quantity of the primary item in the shopping cart, the server correspondingly changes the quantity of the secondary item. For example, when the shopper changes the contents of the shopping cart from four printers to six printers, the server changes the quantity of power cords in the shopping cart from four to six. Optionally, the server asks the shopper for authorization to make the change. The shopper may grant authorization explicitly in response to the server's request, or implicitly by entering a "submit" command that may be responsive to either the change in the quantity of the primary item or the proposed change in the quantity of the secondary item.

In another embodiment of the invention, the attribute of the primary item in the shopping cart is the size of the primary item. Upon change of the size and optionally upon grant of authorization by the shopper, the server changes the size of the secondary item to agree with the size of the primary item. For example, when the shopper changes the size of a photograph in the shopping cart from five-by-seven inches to eight-by-ten inches, the server asks if it may change the size of a mounting board or picture frame in the shopping cart accordingly. If the shopper authorizes the change, the server reconfigures the shopping cart to include a mounting board or picture frame of the proper size.

In yet another embodiment of the invention, the attribute of the primary item in the shopping cart is the color of the primary item. Upon change of the color and optionally upon grant of authorization by the shopper, the server changes the color of the secondary item to agree with the color of the primary item. For example, when the shopper changes the color of a bath towel in the shopping cart from blue to green, the server asks if it may change the color of a washcloth linked to the bath towel in the shopping cart from blue to green. If the shopper authorizes the change, the server reconfigures the shopping cart to include a green washcloth rather than a blue washcloth.

In another embodiment of the invention, the attribute of the primary item in the shopping cart is the presence or absence of the primary item. Upon removal of the primary item from the shopping cart and optionally upon grant of authorization by the shopper, the server removes the secondary item from the shopping cart. For example, when the shopper removes a green bath towel from the shopping cart, the server asks if it may remove a green washcloth associated with the towel in the shopping cart. If the shopper authorizes the removal, the server removes the green washcloth from the shopping cart.

Thus, the present invention helps an on-line shopper to maintain the proper relationship in a shopping cart between primary items and secondary items that are normally ordered along with the primary items, so that the on-line merchant may fill the shopper's order as the shopper intends, and so that the shopper maintains confidence in the on-line shopping process. These and other aspects of the present invention will

DETAILED DESCRIPTION OF THE INVENTION

The present invention helps an on-line shopper to maintain the proper relationship in a shopping cart between primary items and secondary items that are normally ordered along with the primary items, so that the on-line merchant may fill the shopper's order as the shopper intends, and so that the shopper maintains confidence in the on-line shopping process.

Figure 1:
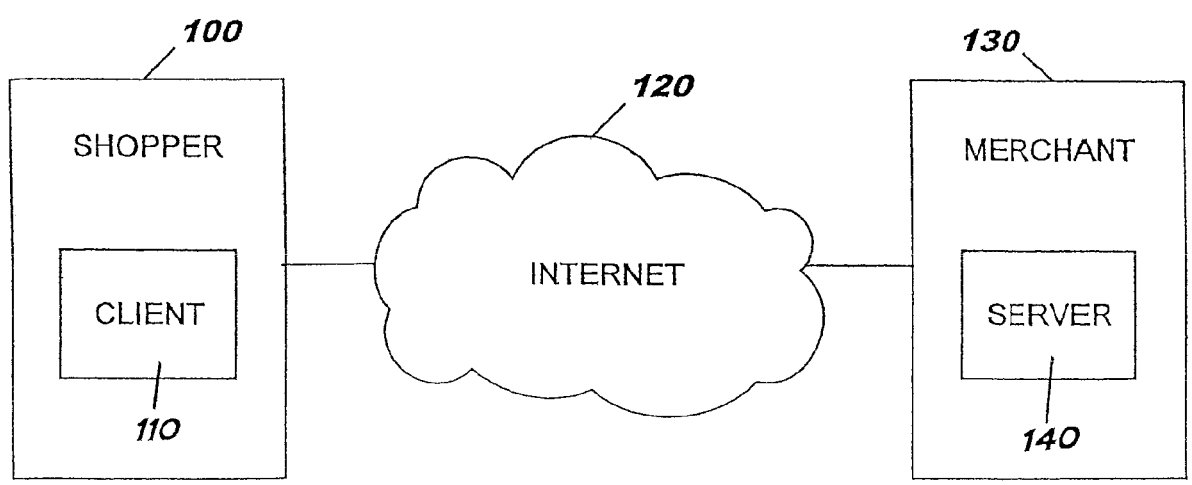
FIG. 1. shows an on-line shopper connected to an on-line merchant's server through the Internet.

FIG. 1 shows an environment suitable for application of the present invention. In FIG. 1, an on-line shopper 100 interacts with a client 110 to access an on-line merchant 130 through the Internet 120 or other communication network. The client 110 may be a computer terminal, a personal digital assistant, a cellular telephone with a wireless access protocol (WAP) browser, and so forth.

Figure 2:
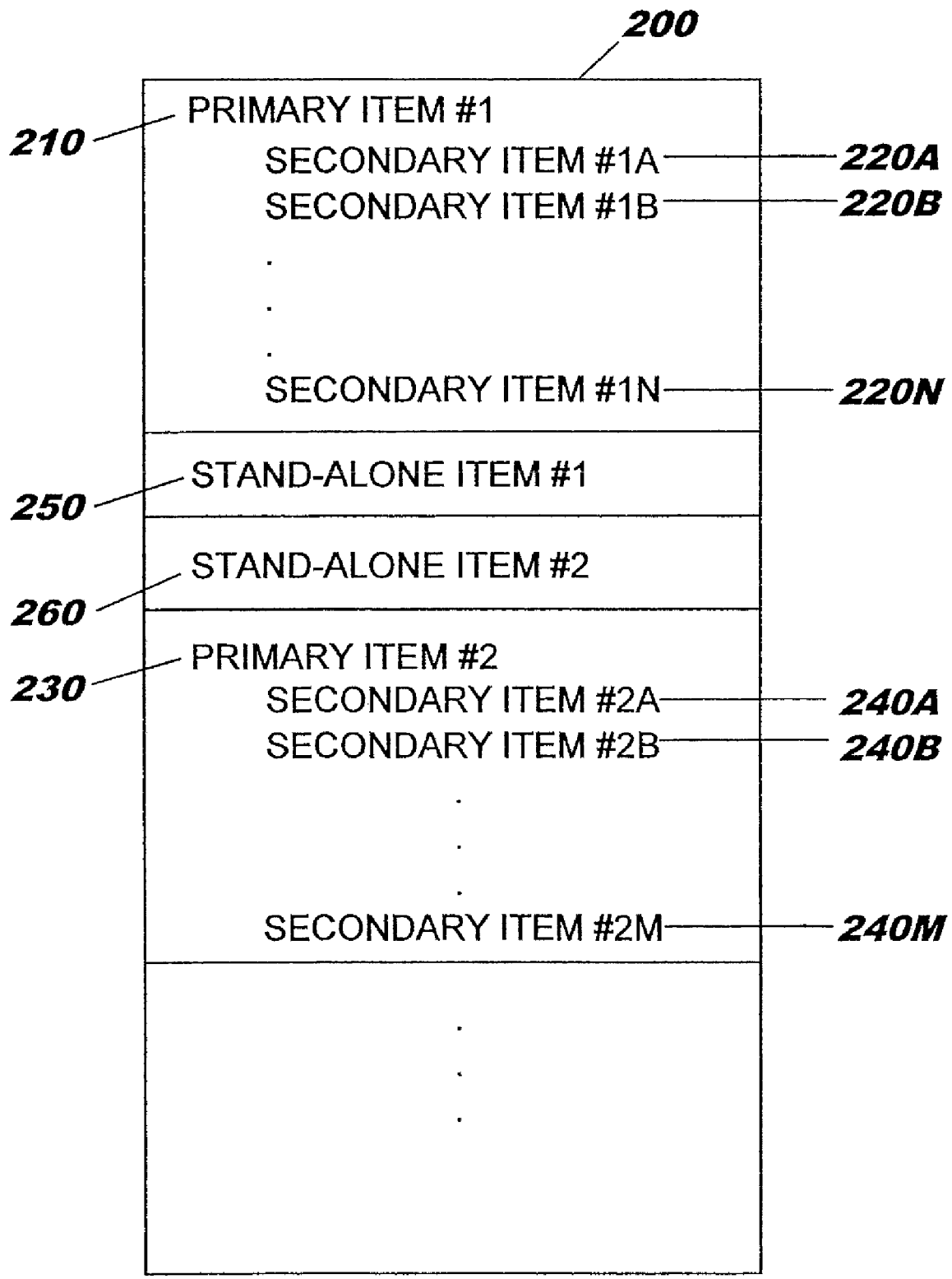
FIG. 2 shows an exemplary shopping cart of items gathered by the on-line shopper of FIG. 1.

The shopper 100 uses shopping commands to assemble a shopping cart 200 of items to be purchased from the merchant 130, as shown in FIG. 2, adding items to the shopping cart 200, changing items in the shopping cart 200, and removing items from the shopping cart 200. Items in the shopping cart 200 are categorized here as primary items, two of which 210 and 230 are shown in the exemplary shopping cart 200, secondary items, N+M of which are shown 220A through 220N and 240A through 240M in the shopping cart 200, and stand-alone items, two of which 250 and 260 are shown in the shopping cart 200.

The secondary items 220A through 220N and 240A through 240M are linked to the primary items 210 and 230, where a link is established as explained below. A secondary item is an item whose purchase is often dependent upon the purchase of the linked primary item. For example, when the primary item "shoes" is purchased, the secondary items "socks" or "shoe polish" may often be purchased at the same time. Typically, the server 140 will direct the attention of the shopper 100 to a secondary item upon selection of a primary item by the shopper 100. The on-line merchant 130 decides which items are primary, which are secondary, and which are linked to which. The stand-alone items 250 and 260 shown in the shopping cart 200 are items which the merchant 130 has not deemed to be either primary or secondary items, or are secondary items that have no antecedent primary items in the shopping cart 200.

The shopper 100 uses shopping commands to direct the server 140. These commands may include, for example, "add item to shopping cart," or "change item in shopping cart," and "remove item from shopping cart," where the particular item and command may be selected by a computer mouse acting upon a web page presented to the shopper 100 by the client 110. The web page upon which the mouse acts may be, for example, a shopping cart page, a product page that describes an item that may be added to a shopping cart, and so forth, including herein any kind of on-line shopping display such as a web page.

Figure 3:
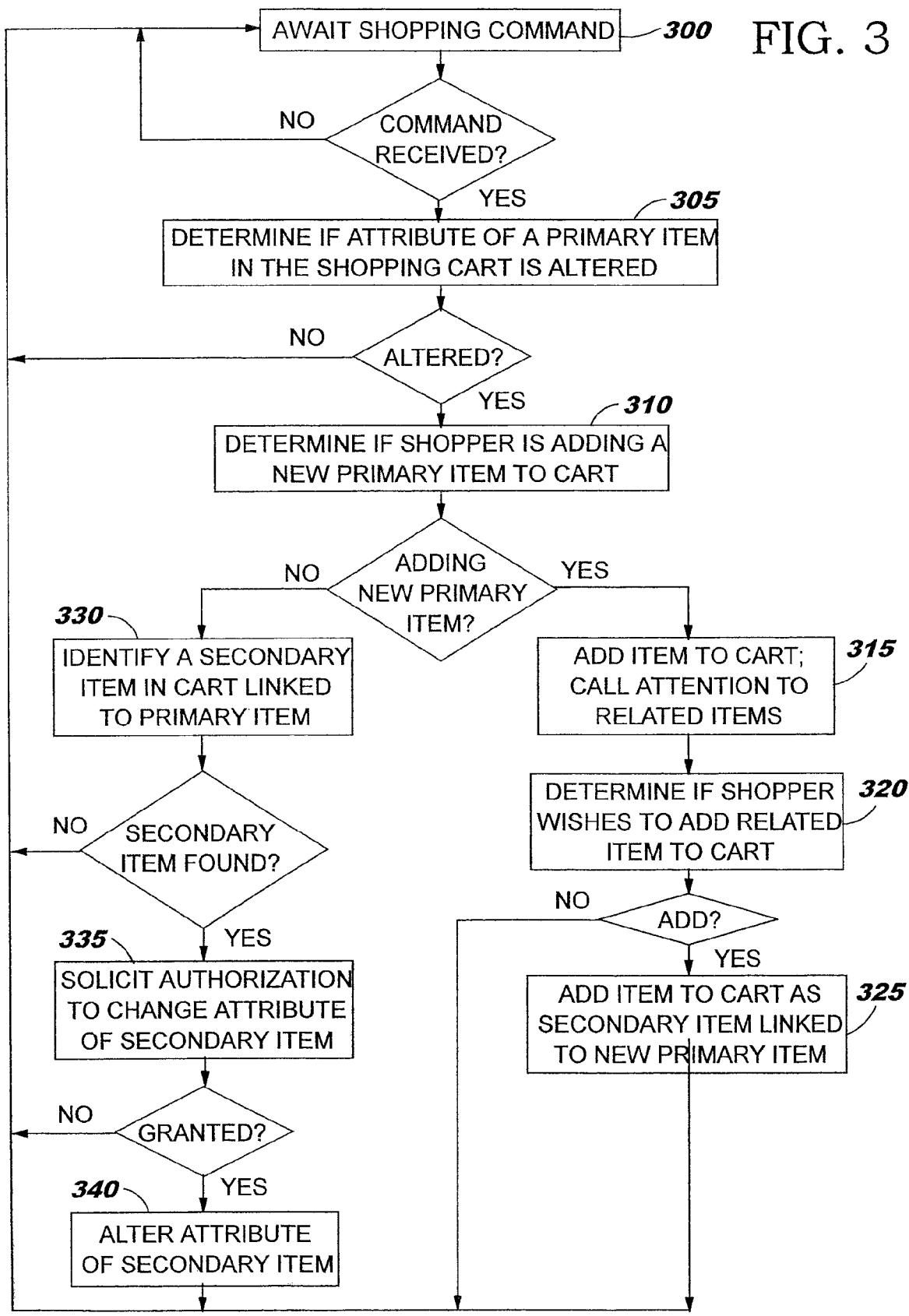
FIG. 3 shows aspects of the operation of the server of FIG. 1.

In response to the shopping commands, the server 140 helps the shopper 100 manage the contents of the shopping cart 200, as shown in FIG. 3. The server 140 awaits a shopping command (step 300). When a shopping command is not received, the server continues to wait (step 300). Otherwise (i.e., a shopping command is received), the server 140 determines whether the shopping command alters an attribute of one of the primary items 210 and 230 in the shopping cart 200 (step 305). When no attribute of the primary items 210 and 230 is altered, the server 140 awaits the arrival of the next shopping command (step 300).

Otherwise (i.e., the shopping command alters an attribute of a primary item in the shopping cart 200), the server 140 determines if the shopper 100 is adding a new (i.e., heretofore absent) primary item to the shopping cart 200 (step 310). When the shopper 100 adds a new item to the cart, the server 140 includes the added item in the shopping cart 200 and may call the attention of the shopper 100 to items that are related to the primary items (step 315). The server 140 then determines whether the shopper 100 desires to add one of the related items to the shopping cart 200 (step 320). If the shopper 100 desires to add one of the related items to the shopping cart 200, the server 140 includes the related item in the shopping cart 200 as a secondary item linked to the primary item (step 325). If the shopper 100 does not desire to add any of the related items to the shopping cart, the server 140 returns to await the next shopping command (step 300).

Otherwise (i.e., the shopper 100 is not adding a new primary item to the shopping cart 200, and is therefore by default changing an attribute of a primary item already in the shopping cart 200), the server 140 attempts to identify any secondary items then in the shopping cart 200 that are linked to the primary item being changed (step 330). If no such secondary items are found, the server returns to await the next shopping command (step 300).

Otherwise (i.e., a secondary item that is linked to the primary item being changed is found in the shopping cart 200), the server 140 optionally solicits authorization of the shopper 100 to change the corresponding attribute of the secondary item responsive to the change in the attribute of the primary item (step 335). If the shopper denies authorization, the server 140 returns to await the next shopping command (step 300). Otherwise (i.e., the shopper 100 grants authorization), the server 140 changes the corresponding attribute of the secondary item responsive to the change in the attribute of the primary item (step 340), and then returns to await the next shopping command (step 300). The shopper may grant authorization explicitly in response to the server's request, or implicitly by entering a "submit" command that may be responsive to either the change in the attribute of the primary item or the proposed change in the attribute of the secondary item.

The attribute of the primary item and the corresponding attribute of the secondary item may be, for example, the quantity of the item in the shopping cart 200, the size of the item, the color of the item, the texture of the item, and so forth. The foregoing list of attributes is to be construed as illustrative of the present invention rather than limiting, and is included here for clarity of description rather than limitation.

In one embodiment of the invention, the corresponding attribute of the secondary item is altered to match the attribute of the primary item (step 340). For example, if the quantity K of the primary item are in the shopping cart 200, then the server 140 will put the quantity K of the secondary item into the shopping cart 200. Likewise, if the primary item is green, the secondary item will also be green, and if the size of the primary item is X, then the size of the secondary item is appropriate to match size X. The present invention is not so limited, however, and other rules may be used when altering the corresponding attribute of the secondary item in response to change in the attribute of the primary item. For example, two alkaline D-cells rather than one may be added to the shopping cart 200 for every flashlight included in the shopping cart 200, pink bath towels may be matched with green washcloths, and so forth, as the merchant 130 desires.

From the foregoing description, those skilled in the art will appreciate that the present invention helps an on-line shopper to maintain the proper relationship in a shopping cart between primary items and secondary items that are normally ordered along with the primary items, so that the on-line merchant may fill the shopper's order as the shopper intends, and so that the shopper maintains confidence in the on-line shopping process. The foregoing description, however, is illustrative rather than limiting, and the scope of the present invention is limited only by the following claims.

We claim:

1. A method for managing an electronic commerce (e-commerce) shopping cart relating to communication between a shopper and a server over a communication network, said method comprising the steps of:

determining by the server whether a shopping command of the shopper has changed an attribute of a primary item in the shopping cart;

after the server has determined that the shopping command has changed the attribute of the primary item in the shopping cart, identifying by the server a secondary item in the shopping cart linked to the primary item; and changing by the server a corresponding attribute of the secondary item in response to the change in the attribute of the primary item, wherein the attribute of the primary item is selected from the group consisting of a quantity of the primary item, a color of the primary item, and a size of the primary item.

2. The method of claim 1, wherein the attribute of the primary item consists of the quantity of the primary item.

3. The method of claim 1, wherein the attribute of the primary item consists of the color of the primary item.

4. The method of claim 1, wherein the attribute of the primary item consists of the size of the primary item.

5. The method of claim 1, wherein after said identifying step and before said changing step, said method further comprising the step of:

soliciting and receiving by the server authorization from the shopper to change the corresponding attribute of the secondary item in response to the change in the attribute of the primary item.

6. The method of claim 1, wherein before said determining step, said method further comprising the step of: waiting by the server for said shopping command and continuing to wait by the server for said shopping command so long as said shopping command has not been received by the server.

7. The method of claim 1, wherein after said determining step has determined that the shopping command has changed the attribute of said primary item and before said identifying step, said method further comprising the steps of:

ascertaining whether the primary item is a new primary item; and after said ascertaining has ascertained that the primary item is not said new primary item, then performing said identifying step.

8. The method of claim 1, wherein the attribute of the primary item and the corresponding attribute of the secondary item are a same attribute.

9. The method of claim 1, wherein the attribute of the primary item and the corresponding attribute of the secondary item are different attributes.

10. The method of claim 1, wherein the communication network comprises the Internet.

11. A system, comprising a server adapted to implement a method for managing an electronic commerce (e-commerce) shopping cart relating to communication between a shopper and a server over a communication network, said method comprising the steps of:

determining by the server whether a shopping command of the shopper has changed an attribute of a primary item in the shopping cart;

after the server has determined that the shopping command has changed the attribute of the primary item in the shopping cart, identifying by the server a secondary item in the shopping cart linked to the primary item; and changing by the server a corresponding attribute of the secondary item in response to the change in the attribute of the primary item, wherein the attribute of the primary item is selected from the group consisting of a quantity of the primary item, a color of the primary item, and a size of the primary item.

12. The system of claim 11, wherein the attribute of the primary item consists of the quantity of the primary item.

13. The system of claim 11, wherein the attribute of the primary item consists of the color of the primary item.

14. The system of claim 11, wherein the attribute of the primary item consists of the size of the primary item.

15. The system of claim 11, wherein after said identifying step and before said changing step, said method further comprising the step of:

soliciting and receiving by the server authorization from the shopper to change the corresponding attribute of the secondary item in response to the change in the attribute of the primary item.

16. The system of claim 11, wherein before said determining step, said method further comprising the step of: waiting by the server for said shopping command and continuing to wait by the server for said shopping command so long as said shopping command has not been received by the server.

17. The system of claim 11, wherein after said determining step has determined that the shopping command has changed the attribute of said primary item and before said identifying step, said method further comprising the steps of:

ascertaining whether the primary item is a new primary item; and after said ascertaining has ascertained that the primary item is not said new primary item, then performing said identifying step.

18. The system of claim 11, wherein the attribute of the primary item and the corresponding attribute of the secondary item are a same attribute.

19. The system of claim 11, wherein the attribute of the primary item and the corresponding attribute of the secondary item are different attributes.

20. The system of claim 11, wherein the communication network comprises the Internet.

* * * * *